I. CHESNEY.
Broom.
No. 1,198.    Patented June 25, 1839.
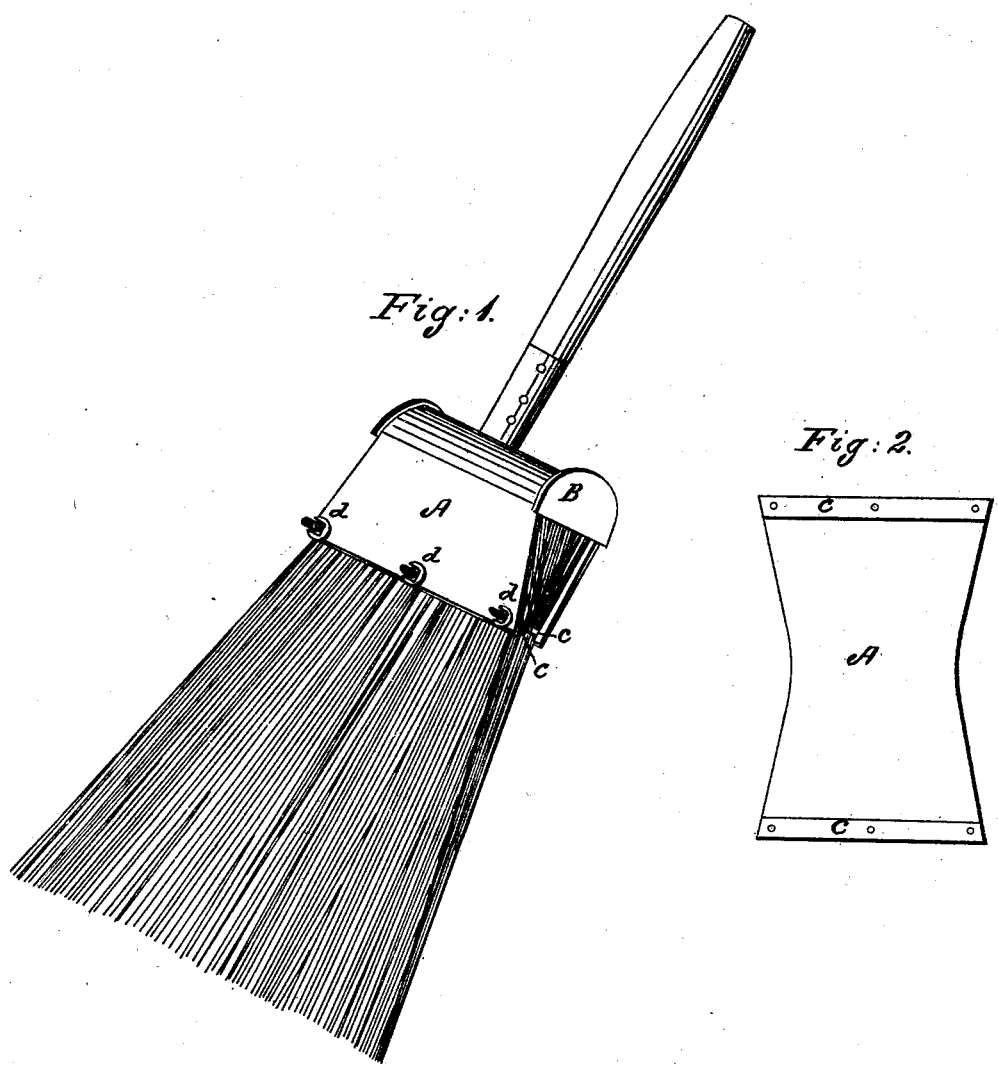

UNITED STATES PATENT OFFICE.

ISAAC CHESNEY, OF LEYDEN, MASSACHUSETTS.

METALLIC CLASP OR HEAD FOR BROOMS.

Specification of Letters Patent No. 1,198, dated June 25, 1839.

*To all whom it may concern:*

Be it known that I, ISAAC CHESNEY, of Leyden, in the county of Franklin and State of Massachusetts, have invented a new and useful Mode of Fastening Together the Brush for Brooms by Means of a Metallic Clasp or Head; and I do hereby declare that the following is a full and exact description.

First, the clasp or head aforesaid, is made of japanned or other tin, sheet-iron or sheet brass. It is constructed in the following manner: cut from the sheet of tin, a pattern in form of a double dove-tail A, Figure 2, having the widest parts thereof about six inches in width, and the narrowest part about four inches. The pattern thus cut out, is to be bent over, so as to have the widest parts of the dove-tail meet, or nearly so. The widest edges of the dove-tail should be turned over, inclosing a narrow strip of iron c, Fig. 1, in order to stiffen the edges. Those parts of the pattern, which form the curve or turn, should be covered with side caps (B) of about one and a half inches deep firmly soldered on, forming a cavity for the reception of the head of the brush in the broom. There are also to be three or more head bolts d Fig. 1 with screw and nut on one end, passing at right angles through the widest parts of the dove-tail, or pattern, after it is bent. These bolts should be near the edges and pass through the strips of iron inclosed by turning the end edges of the pattern. So that by turning the nuts the sides, clasp the brush of the broom and hold it firmly. At the center of the apex of the turn in the pattern there is to be a socket for the handle of the broom, passing through the pattern about half an inch and firmly soldered on.

The operation is as follows: Turn the nuts on the ends of the bolts, which will unloose the clasp, and enable you to put in the brush, which should be cut off from the stock just about the sprouts. Then turn down the nuts, and the brush is clasped and held firm, and is ready for use. When the brush is so worn as to be unfit for use, new brush can be put in, without any expense except for brush.

What I claim as my invention and desire to secure by Letters Patent, is—

The metallic clasp or head made and constructed in the manner herein described, and for the purpose of fastening or confining the brush for a broom.

ISAAC CHESNEY.

Witnesses:
WM. ELLIOT,
ALMON BRAINARD.